E. L. HAHN.
FERTILIZER DISTRIBUTER.
APPLICATION FILED FEB. 6, 1908.

899,449.

Patented Sept. 22, 1908.
2 SHEETS—SHEET 1.

Witnesses

Inventor
Edward L. Hahn.
By Alexander Powell
Attorneys

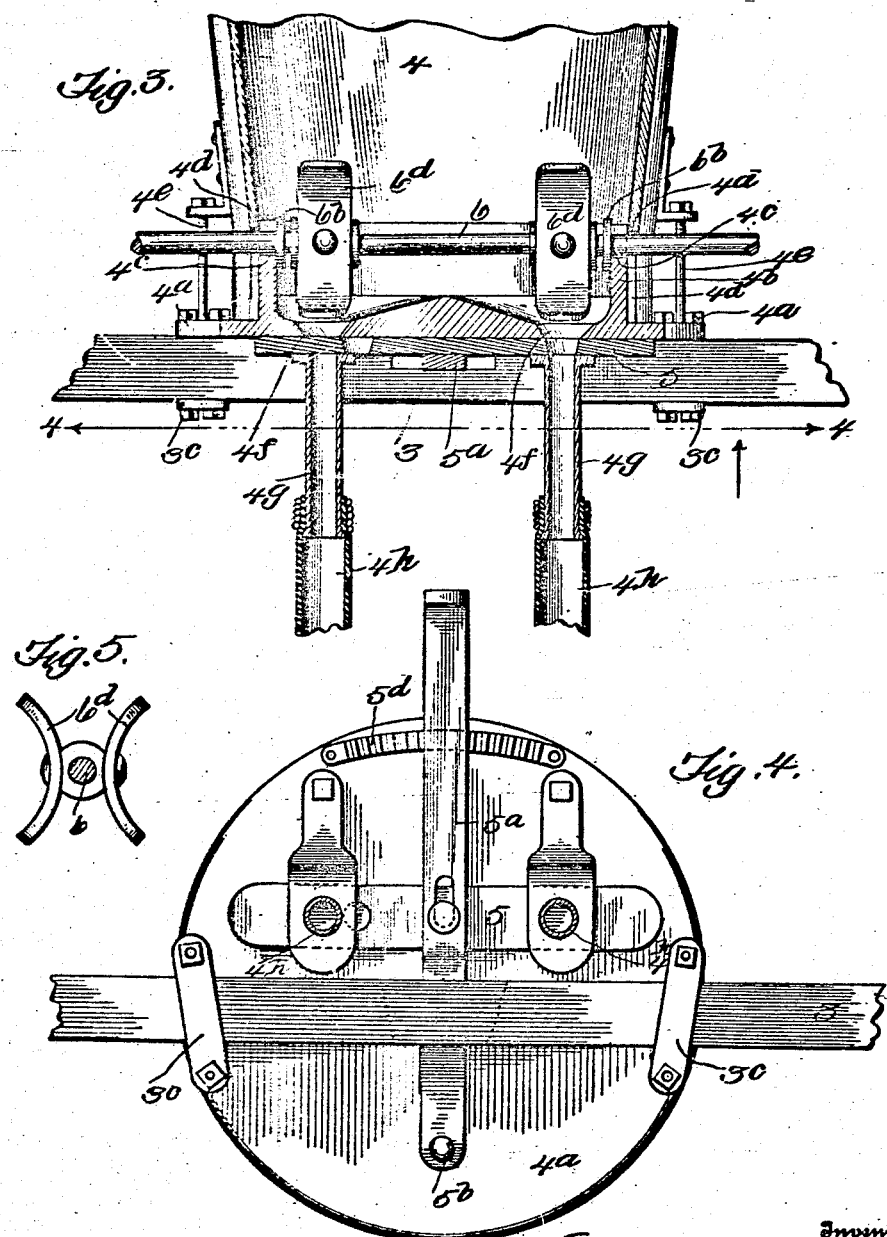

UNITED STATES PATENT OFFICE.

EDWARD L. HAHN, OF MUSCATINE, IOWA.

FERTILIZER-DISTRIBUTER.

No. 899,449.  Specification of Letters Patent.  Patented Sept. 22, 1908.

Application filed February 6, 1908. Serial No. 414,604.

To all whom it may concern:

Be it known that I, EDWARD L. HAHN, of Muscatine, in the county of Muscatine and State of Iowa, have invented certain new and useful Improvements in Fertilizer-Distributers; and I hereby declare that the following is a full, clear, and exact description thereof, reference being had to the accompanying drawings, which form part of this specification.

This invention is an attachment for cultivators and like machines and particularly is an improvement upon the fertilizing distributing attachment shown in my Patent No. 838,856, granted to me December 18, 1906. Its objects are (1) to simplify the construction of the attachment so that it can be applied to either a rigid or pivotal axle cultivator; (2) also to reduce the wearing parts, to simplify the construction and to enable one or more discharge tubes for the fertilizer to be operated from the same hopper, and to enable the fertilizer to be applied either in advance or following the cultivator shovels, so that the fertilizing can either be covered or applied as a top dressing; also to remove all bearings from direct contact with the fertilizer, thus lessening the liability of rust and corroding of the bearings and providing a positive or force feed for the fertilizer.

In the accompanying drawings I have illustrated the attachment as applied to a riding two-wheel cultivator; but it will be understood that it can be used on various other kinds of cultivators, also on other vehicles and wheeled farm implements having a driven shaft or wheel from which power can be transmitted to the operating shaft of the attachment.

Figure 1:
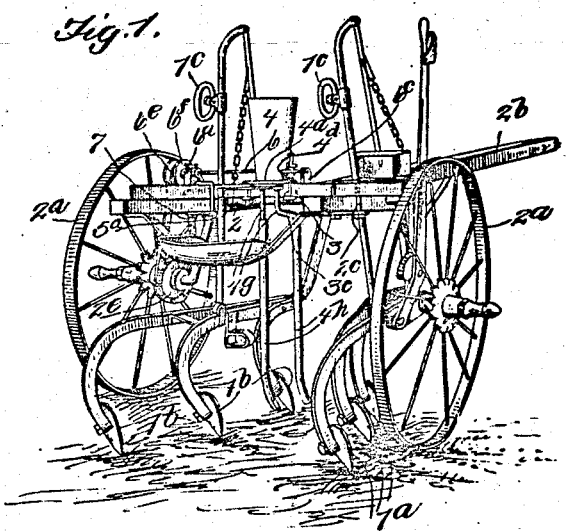
Figure 2:
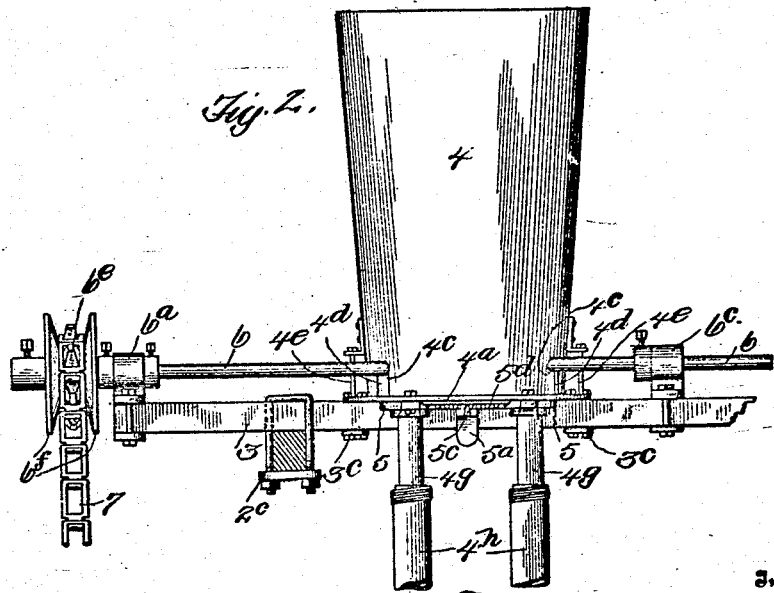

In said drawings—Figure 1 is a perspective view of a wheeled cultivator with my improved fertilizer-distributer attachment applied thereto. Fig. 2 is an enlarged rear view of the attachment, detached. Fig. 3 is an enlarged vertical sectional view thereof. Fig. 4 is a bottom plan view thereof. Fig. 5 is a detail view of one of the feeding or agitating devices.

The cultivator shown in Fig. 1 of the drawings is a straddle row two-wheel cultivator, and has a main axle 2, supported on carrying wheels $2^a$, and provided with a tongue $2^b$; and to the opposite legs of the axle are connected the cultivator beams carrying shovels $1^a$, $1^b$, and which can be manipulated in the usual manner. These parts are, or may be, of any well known or preferred construction and need no detailed explanation herein.

To the cultivator frame is attached a bar 3, by clips $2^c$, or in any other suitable manner, it only being desirable that the bar 3 should be substantially horizontal and preferably parallel with the axes of the wheels. On this bar 3 is adjustably secured the fertilizer distributer, comprising a hopper 4, and a base plate $4^a$, to which the hopper 4 is secured; this base plate can be adjustably fastened to the bar 3 by means of clips $3^c$, or in any other convenient manner.

The base plate $4^a$ has a flange $4^b$ around which the lower end of the hopper 4 is secured, and this flange is notched as at $4^c$ to form bearings for the inner end of a shaft 6, the outer end of which is journaled in a bracket $6^a$, attached to the bar 3; and this hopper can be adjusted to or from the bearing $6^a$ so as to locate the distributer at the desired point relative to the shovels.

The hopper 4 is slotted at $4^d$ to fit over the shaft 6, and at the same time make a sufficiently tight joint with the flange $4^b$, the hopper 4 can be detachably secured to the plate $4^a$ by the bolts $4^e$.

Washers $6^b$ can be strung on shaft 6 within the hopper so as to prevent the fertilizer escaping through the openings $4^c$. The end of this shaft may be journaled in a bracket $6^c$ attached to bar 3 as shown.

The plate $4^a$ is provided with apertures $4^f$ in its bottom communicating with short tubes $4^g$; and strung on the shaft 6, over these apertures $4^f$, are force feed devices or paddles $6^d$, which are adapted to agitate the material in the hopper and push it through said openings into the spouts $4^g$.

The size of the feed openings $4^f$ may be regulated by a slide 5, interposed between the upper ends of the tubes $4^g$ and the bottom plate $4^a$; said slide 5, being supported by said tubes which are fastened to the under-side of plate $4^a$.

The slide 5 can be shifted by means of a lever $5^a$ pivoted at $5^b$ to the under side of plate $4^a$ and provided with a tooth $5^c$, adapted to engage a toothed segment $5^d$, on the under side of the bottom plate $4^a$, so as to hold the slide in any position to which it is adjusted. The lever $5^a$ is sufficiently resilient to enable its tooth $5^c$ to be sprung into or out of engagement with the teeth of segment $5^d$.

The tubes $4^g$ are connected to distributing pipes 4ʰ which are preferably of ordinary hose, and can be arranged to deliver the fertilizer either behind the shovels 1ª, 1ᵇ, or in front thereof; so as to either top dress or sub-fertilize the soil.

The shaft 6 may be driven by means of a sprocket-chain 7, running over a sprocket 2ᵉ, fast to the hub of one of the wheels 2ª, and running over a sprocket 6ᵉ, on the outer end of shaft 6. The sprocket 6ᵉ preferably has deep side flanges 6ᶠ, which prevent the chain disengaging the sprocket, even if it has to be operated at an angle to the driver, and also permits the devices to be used in connection with a pivoted axle cultivator.

When the attachment is properly positioned on the machine the paddles 6ᵈ will force the fertilizer or seed in hopper 4 through the openings 4ᶠ into the tubes 4ᵍ, and hose 4ʰ, by which it will be delivered in front of, beside or behind, the shovels according to the wish of the user; and the amount of the material fed is controlled by adjusting valve 5.

If desired only one opening 4ᶠ need be used and the other opening can be stopped. The discharge hose 4ʰ can be adjusted so as to make a top dressing of the fertilizer, or can be adjusted to follow any of the shovels as desired. In either case the fertilizer will immediately work into the loose moist soil and become available as plant food.

By this device I obtain a force feed of the fertilizer, and the apparatus can be used to distribute seed or seed mixed with the fertilizer if desired. By this invention the fertilizer can be supplied at different times during the cultivation of the crops and at the sides of the growing plants in the rows with practically no expense to the agriculturist, as the attachment can be placed on the ordinary cultivators so as to apply the fertilizer simultaneously with the cultivation of the plants, and by the same machine used for cultivating.

Having described my invention what I claim as new and desire to secure by Letters Patent is:

1. In combination with a wheeled cultivator, of a removable attachment therefor, comprising a bar detachably attached to the cultivator frame, a plate adjustably attached to said bar and having a plurality of feed openings, a hopper on said plate, a shaft parallel with the bar and journaled in bearings thereon and extending transversely of and through the hopper, paddles fixed on said shaft within the hopper, tubes attached to said plate below the feed openings, a slide valve for regulating the size of the feed openings, a lever for operating the said valve, and sprocket chain and gears for driving said shaft from the vehicle wheels.

2. In combination with a straddle-row cultivator, of a detachable attachment comprising a bar adjustably and removably attached to the cultivator frame, a plate adjustably attached to said bar and provided with a plurality of feed openings, a hopper detachably secured on said plate, a shaft mounted on the bar and parallel therewith and extending into the hopper, sprocket chain and gearing for rotating said shaft from the cultivator wheels, stirrers in said hopper over the openings in the plate, and tubes connected with the openings in said plate for conducting material from the feed openings to the shovels.

3. In combination with a cultivator, a removable attachment therefor comprising a bar detachably attached to the cultivator frame, a perforated plate mounted on said bar and having a feed opening, a hopper mounted upon said plate, a shaft mounted on said bar and extending parallel with the bar through the hopper and above the feed opening in the said plate, agitating devices within the hopper operated by said shaft, a tube suspended from the plate below the feed opening for conducting the material from the feed opening to the shovel, a valve attached to the plate for regulating the size of the feed opening in the plate, and sprocket chain and gears for driving said shaft from the cultivator wheels.

In testimony that I claim the foregoing as my own, I affix my signature in presence of two witnesses.

EDWARD L. HAHN.

Witnesses:
FRED LEU, Jr.,
J. A. BOND.